United States Patent [19]
Ragon

[11] 4,413,862
[45] Nov. 8, 1983

[54] TRACK RECOIL SYSTEM

[75] Inventor: Danny L. Ragon, East Dubuque, Ill.

[73] Assignee: Deere & Company, Moline, Ill.

[21] Appl. No.: 207,167

[22] Filed: Nov. 17, 1980

[51] Int. Cl.$^3$ ............................................. B62D 55/30
[52] U.S. Cl. ...................................... 305/10; 305/31; 305/32
[58] Field of Search ................... 305/10, 22, 31, 32; 403/379

[56] References Cited

U.S. PATENT DOCUMENTS

| | | | |
|---|---|---|---|
| 1,865,087 | 6/1932 | Daniel | 305/32 |
| 3,779,615 | 12/1973 | Kennicutt et al. | 305/10 X |
| 3,829,172 | 8/1974 | Oestmann et al. | 305/10 |
| 3,980,351 | 9/1976 | Orr et al. | 305/10 |
| 4,088,377 | 5/1978 | Corrigan | 305/10 |
| 4,223,878 | 9/1980 | Isaia et al. | 305/10 X |

FOREIGN PATENT DOCUMENTS

| | | | |
|---|---|---|---|
| 1228217 | 11/1966 | Fed. Rep. of Germany | 403/379 |
| 2426389 | 12/1979 | France | 403/379 |

Primary Examiner—Charles A. Marmor

[57] ABSTRACT

A track recoil system includes a track adjuster actuator which may be extended by the introduction of grease to compress a previously installed coil compression spring to establish a pre-selected preload in the latter. The track adjuster includes a housing having a cylinder telescopically mounted therein with the housing bearing directly on the spring and with the cylinder having a head engaged with a removable adjuster stop when the adjuster is being extended for compressing the spring. Preload spacers hold the housing in place to in turn hold the spring in a desired preloaded state so as to permit grease to be bled from the actuator to allow the adjuster to be collapsed by backing the cylinder head away from the adjuster stop so as to leave clearance between the adjuster for permitting the adjuster to be later extended, if necessary, to accommodate for an increase in track length due to wear. Compression of the spring may be accomplished by removing the adjuster stop and inserting a suitable jack between a track frame member, to which the stop is releasably secured, and the adjuster.

3 Claims, 7 Drawing Figures

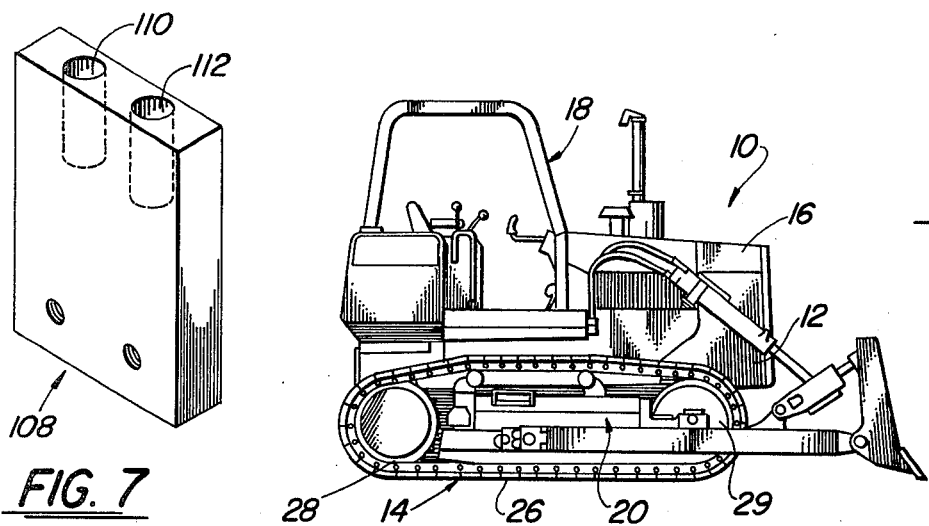
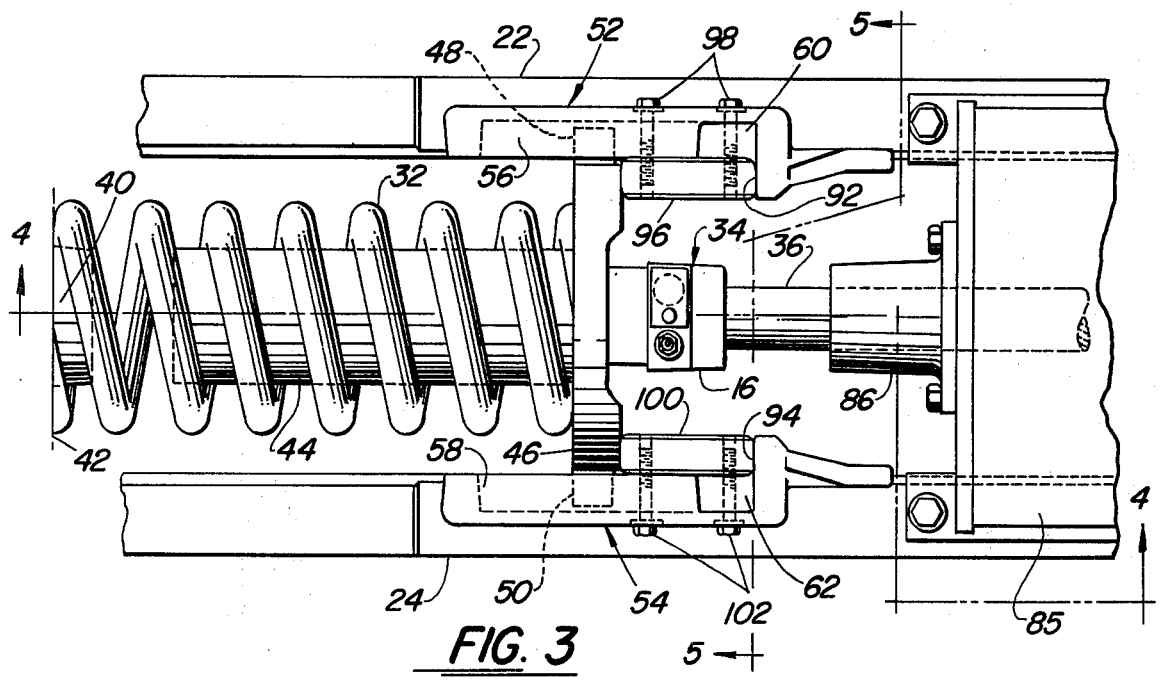
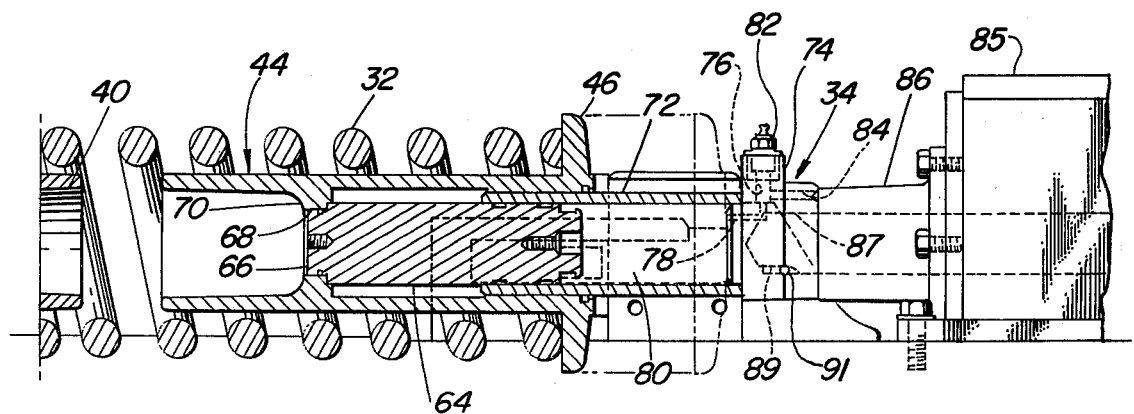

TRACK RECOIL SYSTEM

BACKGROUND OF THE INVENTION

The present invention relates to recoil systems for yieldably maintaining proper tension in tracks of track laying vehicles.

Historically, track recoil systems have embodied large coil compression springs which were required to be precompressed prior to being installed on a tractor as part of the recoil system. Recently, in order to overcome the safety hazard attendant with compressing and handling precompressed springs on an assembly line, a track recoil system has been designed which permits the spring to be installed in its free state and later compressed for operation by using an ordinary grease gun. Such a design is disclosed in U.S. Pat. No. 3,980,351, issued to Orr et al on Sept. 14, 1976.

The patented structure is not entirely satisfactory since it requires a number of long bolts or cap screws to be manipulated in order to retain the spring in a desired precompressed condition. Also, the structure does not have any stop for preventing the grease fittings from rotating about the track adjuster piston to a relatively inaccessable position.

SUMMARY OF THE INVENTION

According to the present invention, there is provided an improved track recoil system of the type designed for permitting coil compression springs to be assembled in and disassembled from the system in free or uncompressed states.

An object of the invention is to provide a track recoil system, which is of a relatively simple design, permitting the recoil spring to be assembled in and disassembled from the system while in a free or uncompressed state.

A more specific object of the invention is to provide a track recoil system wherein the track adjuster includes a housing having a pair of tabs respectively disposed in a pair of guides and a pair of preload spacers releasably secured to the guides for holding the adjuster in a preselected position for retaining the spring in a desired degree of precompression.

A further object of the invention is to provide preload spacers, as set forth in the preceding object, which are constructed for easy, safe installation and removal and which may be made in different sizes for varying the preload of the recoil spring.

Another object is to provide a track recoil system including a track adjuster incorporating a piston which remains fixed relative to the adjuster housing and a cylinder reciprocably received in the housing and on the piston.

Yet another object of the invention is to provide a track recoil system wherein the recoil spring may be replaced without exposing parts of the track adjuster to contaminants.

Still another object of the invention is to provide a track adjuster embodying grease fittings and to provide a simple connection between the adjuster and a motion transfer rod extending to the idler wheel which prevents the grease fittings from rotating out of position.

These and other objects will become apparent from a reading of the following description, together with the appended drawings.

BRIEF DESCRIPTION OF THE DRAWINGS

FIG. 1 is a right side view of a crawler tractor embodying the present invention.

FIG. 3 is a top plan view of a portion of the right track frame and associated track recoil assembly in a working condition.

FIG. 4 is a vertical sectional view taken along line 4—4 of FIG. 3, but showing the track adjuster piston in an extended nonworking position.

FIG. 7 is a perspective view of an alternate form of preload spacer.

DESCRIPTION OF THE PREFERRED EMBODIMENT

Figure 2:
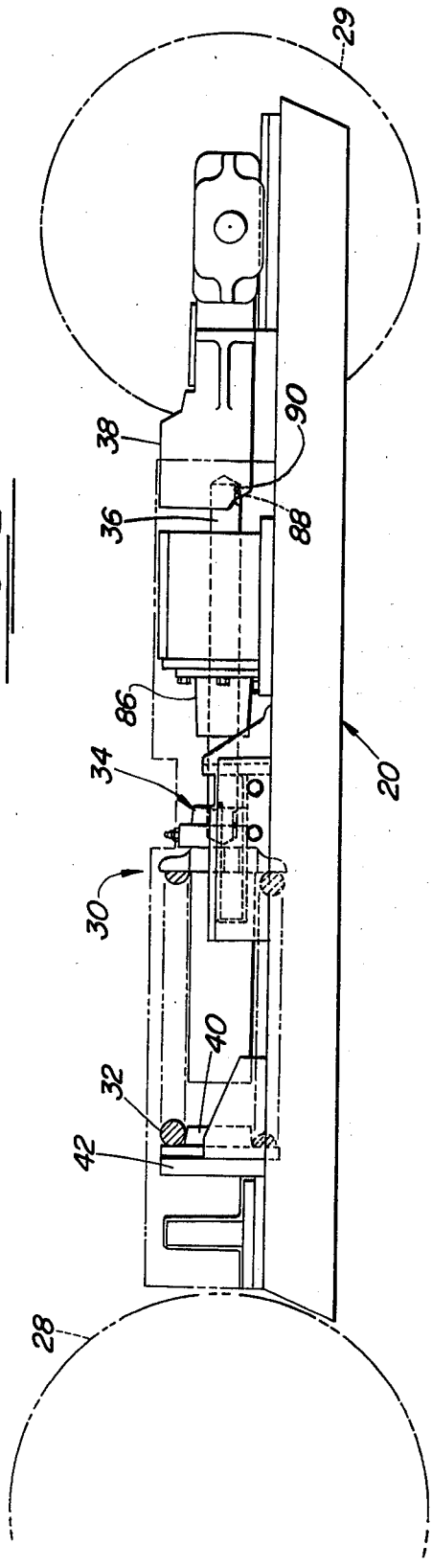
FIG. 2 is located on the second sheet of drawings and is a right side view of the right track frame and associated track recoil assembly.
Figure 5:
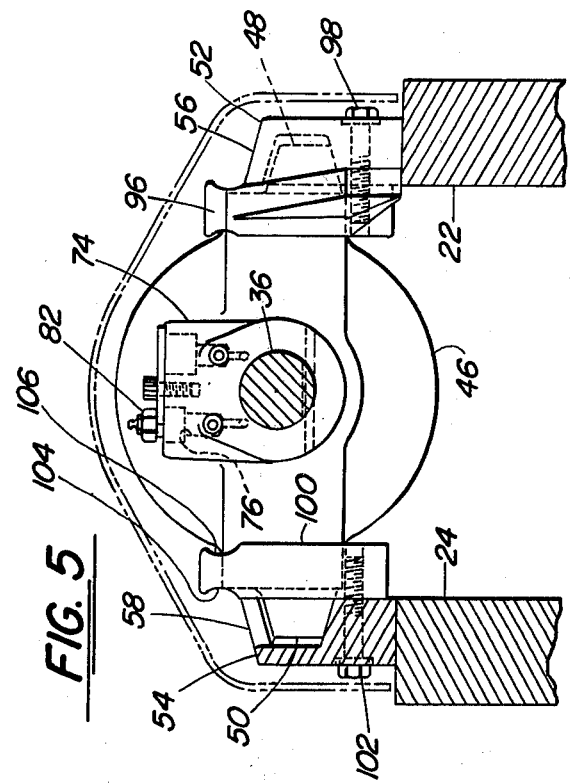
FIG. 5 is an enlarged vertical sectional view taken along line 5—5 of FIG. 3.
Figure 6:
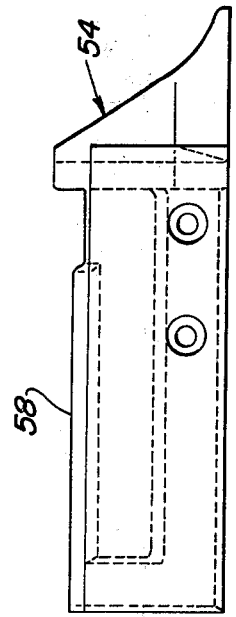
FIG. 6 is an enlarged right side view of the right hand track adjuster guide.

Referring to FIG. 1, therein is shown one type of track laying vehicle with which the present invention may be used. Specifically, illustrated in FIG. 1 is a crawler tractor 10 including a main longitudinal frame 12 supported by a right-hand track assembly 14 disposed along the right-hand side thereof and a left-hand track assembly (not shown) similarly disposed along the left-hand side thereof. The tractor 10 is powered by an engine contained within an enclosure 16 mounted on the forward portion of the frame 12, while the tractor is controlled by various controls located at an operator's station 18 mounted on the rearward portion of the frame 12.

The right- and left-hand track assemblies are identical in the area to which the present invention pertains and, for the sake of brevity, only the right-hand track assembly 14 is shown and described. Thus, the track assembly 14 includes a longitudinally extending track frame 20 comprising transversely spaced, parallel inner and outer side rails 22 and 24 respectively. The frame 20 is located within the confines of an endless drive track 26 which extends about a drive sprocket 28 supported by the tractor frame 12 and an idler wheel 29 disposed between and mounted on the rails 22 and 24 (FIG. 3) for permitting fore-and-aft shifting therealong.

Provided for yieldably biasing the idler wheel 29 against the track 26 for maintaining a desired amount of tension in the track and for permitting obstacles to pass between the sprocket 28 and the track is a track recoil assembly 30 (FIG. 2). The track recoil assembly 30 is, in effect, in the form of a compressible strut defined by a series of components arranged in end-to-end relationship. Specifically, the strut includes a coil compression spring 32, a track adjuster 34, a motion transfer rod 36 and an idler wheel mounting yoke 38.

As can best be seen in FIGS. 2-4, the coil compression spring 32 is supported at its rear end by a forwardly projecting spring retainer 40 in the form of a spud located midway between the rails 22 and 24 and fixed to or forming a portion of a bar 42 which joins the rails. The track adjuster 34 includes a cylindrical tubular housing 44 received in the forward end of the spring 32 and having a forward end defined by an annular flange 46 which is engaged with the forward end of the spring. The housing 44 serves to support the forward end of the spring from the track rails 22 and 24 and for that purpose, the flange 46 is provided with inwardly and outwardly projecting support tabs or ears 48 and 50, respectively, which are respectively received in outwardly and inwardly opening channels of inner and outer track adjuster guides 52 and 54, respectively. The guides 52 and 54 are respectively fixed to the rails 22 and 24 and include respective upper flanges 56 and 58 having access openings 60 and 62 in their forward ends through which the adjuster housing ears 48 and 50 pass during assembly and disassembly of the recoil assembly. Inasmuch as the ears 48 and 50 register with the openings 60 and 62 when the spring 32 is in its uncompressed state, it will be appreciated that the flanges 56 and 58 prevent the spring from accidentally discharging upwardly from the guides 52 and 54.

The adjuster housing 44 is shifted rearwardly to compress the spring 32 by means of a hydraulic actuator including a piston 64 disposed centrally in the housing 44 and having a reduced-in-diameter rear end portion 66 received in a piston centering hole 68 located in a partition 70 provided in the housing 44. The actuator further includes a cylinder 72 reciprocably received in the forward end of the housing and having an open rear end reciprocably received on the piston 64. The cylinder 72 has a closed forward end defined by a head 74 in which is provided a vertical, threaded grease fitting bore 76 which intersects a grease passage 78 having an open end in fluid communication with a cavity 80 defined forwardly of the piston 64 by the cylinder 72. A grease fitting 82 is received in the bore 76 and provides a means through which grease may be introduced into the cavity 80 by the use of a conventional grease gun. Intersecting the bore 76 at a location spaced upwardly from the bottom of the fitting 82 is a grease bleed passage 84 leading to the surface of the head 74. Unscrewing of the fitting 82 establishes fluid communication between the passages 78 and 84 to thus permit grease to be bled from the cavity 80. Fixed to a frame support 85 of the frame 20 and located in axial alignment with and forwardly of the head 74 is a horseshoe-shaped track adjuster stop 86. The motion transfer rod 36 is received within the confines of the stop 86 and has a rearward end received in a receptacle 87 provided in the head 74 and a forward end received in a receptacle defined by the yoke 38. The forward and rearward ends of the rod 36 have flats 88 and 89, respectively, formed thereon and roll pins 90 and 91 are received in cross-passages located in the yoke 38 and head 74 and engage the flats so as to prevent the rod 36 from rotating relative to the yoke and to prevent the cylinder 72 from rotating about the rod 36. It is to be noted that in lieu of the roll pins 90 and 91, the receptacle 87 and the receptacle in the yoke 38 may be provided with flats complimenting the flats 88 and 89 of the rod 36.

The access openings 60 and 62 are spaced forwardly from the bar 42 by a distance approximately equal to the free length of the spring 32 plus the thickness of the flange 46 of the track adjuster housing 44, and the track adjuster stop 86 is spaced forwardly from the openings 60 and 62 by a distance slightly greater than the fore-and-aft dimension of the cylinder head 74. This makes it possible to install the spring 32 on the track frame 20 in a completely uncompressed condition by first preassembling the piston 64 and the cylinder 72 in the adjuster housing 44 and inserting the latter into the forward end of the spring 32, and then by engaging the rear of the spring 32 on the spring retainer 40 and lowering the ears 48 and 50 of the housing flange 46 into the access openings 60 and 62. The flange 46 will then be positioned, as shown in broken lines in FIG. 4, and the cylinder head 74 will be positioned closely adjacent to or against the stop 86, as shown in solid lines in FIG. 4.

The spring 32 can then be compressed to a working position, as shown in FIGS. 2-4, by either using a grease gun to pump grease into the cavity 80 by way of the fitting 82 or by disconnecting the track adjuster stop 86 from the frame support 85 and placing any suitable jack between the frame support and the head 74. In the case of using a grease gun, grease entering the cavity 80 will act on the piston 64 to first securely seat the head 74 against the stop 86 and then to shift the adjuster housing 44 rearwardly to compress the spring 32 to establish a desired preload therein. However, with the head 74 engaged with the stop 86, the adjuster 34 cannot be lengthened to accommodate for any increase the track 26 may undergo due to track pin and bushing wear, for example. Accordingly, it is necessary to provide some means for holding the spring 32 properly compressed while the head 74 is backed away from the stop, the head 74 being shown in a normal working position in FIG. 3 wherein the adjuster 34 is positioned properly for use with a new track 26. To this end, the guides 52 and 54 include respective abutment surfaces 92 and 94 located in the path of movement of the flange 46 of the housing 44. A first preload spacer 96 has a forward surface engaged with the abutment surface 92 and is held in place by a pair of cap screws 98 which extend transversely through the inner guide 52 and into threaded holes in the spacer. Similarly, a second spacer 100 has a forward surface engaged with the surface 94 and is held in place by a pair of cap screws 102 received in transverse bores in the outer guide 54 and threaded into bores provided in the spacer. Installation of the spacers 96 and 100 is done after the track adjuster 34 has been actuated to compress the spring 32 slightly beyond its normal working position. Grease is then bled from the cavity 80 by unscrewing the fitting 82 to establish fluid communication between the bleed passage 78 with the passage 84. As pressure is bled off, the flange 46 moves forward into engagement with the spacers 96 and 100 to thereby relieve the load tending to collapse the cavity 80. A different preload may be established by selecting spacers of different lengths.

In the interest of safety, the spacers 96 and 100 are respectively provided with longitudinally extending pairs of recesses 104 and 106 located in the opposite sides of the spacers adjacent their tops. The pairs of recesses 104 and 106 provide finger holds which permit the spacers to be installed without the installer placing his hands in the "line of action" of the spring-loaded flange 46. An alternate spacer 108 is shown in FIG. 7 wherein a pair of vertical holes 110 and 112 are provided for permitting an installer to insert a finger and thumb into the holes for manipulating the spacer into place without placing his hand between the flange 46 and the spacer.

The operation of the invention is thought to be evident from the foregoing description and for the sake of brevity, the operation is not reiterated.

I claim:

1. In combination with a track frame for a track-laying tractor, a recoil system for yieldably maintaining track tension comprising: said frame including a pair of transversely spaced track-adjuster guides defining horizontal channels opening toward each other and front and rear end walls closing opposite ends of each of said channels; said front walls projecting towards each other beyond said channels and each defining a rearwardly facing abutment surface; each track-adjuster guide being provided with an access opening leading vertically into the channel adjacent said front wall; a first stop fixed to the frame at a location spaced rearwardly from said track-adjuster guides; a coil compression spring having one end engaged with said stop and a second end located between said track-adjuster guides; an extensible and retractable hydraulic track adjuster having a flange engaged with said second end of the spring and said flange including a pair of oppositely projecting tabs respectively slidably received in said channels defined by said pair of track-adjuster guides; said tabs being dimensioned to pass through said access openings and being located so as to pass through said access openings only when said spring is in an unloaded state; and a pair of preload spacer blocks respectively releasably secured to said pair of track-adjuster guides in sandwiched relationship between said flange and said rearwardly facing abutment surfaces, whereby said spacer blocks establish a preselected preload in said spring and transfer all forces exerted thereon as a result of the action of the spring directly to said frame.

2. The combination defined in claim 1 wherein the preload spacer blocks are provided with finger grips located so as to be above the path of movement of the adjuster whereby the spacers may be safely installed or removed.

3. The combination defined in claim 1 wherein the preload spacer blocks are each provided with a pair of vertical bores extending from respective upper surfaces thereof, the bores being spaced such as to permit simultaneous insertion of a thumb and finger of a worker's hand whereby the spacers may be safely installed or removed.

* * * * *